(12) United States Patent
Mittal et al.

(10) Patent No.: US 7,908,257 B2
(45) Date of Patent: Mar. 15, 2011

(54) READ MOSTLY DATABASE TABLES

(75) Inventors: Pravin Mittal, Redmond, WA (US);
Hanumantha Rao Kodavalla, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 374 days.

(21) Appl. No.: 12/014,764

(22) Filed: Jan. 15, 2008

(65) Prior Publication Data
US 2009/0182746 A1 Jul. 16, 2009

(51) Int. Cl.
*G06F 17/30* (2006.01)
(52) U.S. Cl. ...................................... 707/704
(58) Field of Classification Search .................. 707/638, 707/690, 694, 695, 704, 802, 812
See application file for complete search history.

(56) References Cited

U.S. PATENT DOCUMENTS

| | | | | |
|---|---|---|---|---|
| 5,485,607 | A | * | 1/1996 | Lomet et al. ............ 707/999.008 |
| 5,742,813 | A | | 4/1998 | Kavanagh et al. |
| 5,983,225 | A | * | 11/1999 | Anfindsen ............... 707/999.008 |
| 6,122,640 | A | | 9/2000 | Pereira |
| 6,289,410 | B1 | | 9/2001 | Cummins |
| 6,298,319 | B1 | * | 10/2001 | Heile et al. ...................... 703/26 |
| 6,370,529 | B1 | | 4/2002 | Kruglikov et al. |
| 6,728,709 | B1 | | 4/2004 | Plasek et al. |
| 6,754,656 | B1 | | 6/2004 | Cornwell et al. |
| 6,772,155 | B1 | | 8/2004 | Stegelmann |
| 6,823,337 | B2 | | 11/2004 | Armstrong et al. |
| 7,269,588 | B1 | * | 9/2007 | Verma et al. ............ 707/999.008 |
| 7,792,805 | B2 | * | 9/2010 | Shavit et al. .................. 707/704 |
| 2004/0205066 | A1 | | 10/2004 | Bhattacharjee et al. |
| 2006/0212573 | A1 | | 9/2006 | Loaiza et al. |

OTHER PUBLICATIONS

Stonebraker, et al.,"C-Store: A Column-oriented DBMS", Proceedings of the 31st VLDB Conference, Trondheim, Norway, 2005.
McKenney, et al., "Exploiting Deferred Destruction: An Analysis of Read-Copy-Update Techniques in Operating System Kernels" Draft—Jan. 3, 2005. pp. 1-41.
Seltzer, et al., "Beyond Relational Databases" Apr. 2005. pp. 1-9.

* cited by examiner

Primary Examiner — Cam-Linh Nguyen

(57) ABSTRACT

Described is a technology by which a database management system more efficiently processes read requests than write requests for a read-mostly database table, which is a database table that is generally read far more often than written. A lock partitioning mechanism may be implemented to provide a read lock for each CPU of a plurality of CPUs, in which only one read lock is acquired to process a read request. A database table state changing mechanism may be implemented that more efficiently processes read requests relative to write requests by maintaining the database table in a read-only state until a write request is processed. When a write request is received, the database table is changed to a read-write state to process the write request. The database table is then reset back to a read-only state, such as by running a background thread.

16 Claims, 5 Drawing Sheets

READ MOSTLY DATABASE TABLES

BACKGROUND

In online transaction processing (OLTP) environments, data processing efficiency provides a competitive advantage. An organization known as the Transaction Processing Performance Council (TPC) runs benchmark testing (TPC-E) that simulates the OLTP workload of a brokerage firm to evaluate transaction processing performance. The focus of the benchmark is a central database that executes transactions related to the brokerage firm's customer accounts. Although the underlying business model of TPC-E is a brokerage firm, the database schema, data population, transactions, and implementation rules are designed to be broadly representative of other modern OLTP systems.

To improve data processing efficiency, multiple processor (multi-core) systems are utilized to run the database programs. Various locking and other contention management schemes are used to avoid conflicts. However, on multi-core systems, when the number of cores exceeds sixteen, contention for the lock has been found to cause severe scalability problems. As any improvements in online transaction processing are highly beneficial, resolving such scalability issues to any extent in multi-core systems configured for online transaction processing is of value.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a database management system more efficiently processes read requests relative to write requests for a read-mostly database table, wherein a read-mostly database table is one that is generally accessed far more often for reads than writes.

In one example aspect, a lock partitioning mechanism provides a read lock for each CPU of a plurality of CPUs, in which only one read lock is acquired to process a read request. In one example, providing the read lock for each CPU comprises combining a resource identifier and a CPU identifier to access a lock hash table. Write requests require acquiring a write lock for every CPU.

In one example aspect, a database table state changing mechanism more efficiently processes read requests relative to write requests by maintaining the database table in a read-only state until a write request is processed. As reads while in the read-only state do not conflict, locks are generally not required to handle reads. When a write request is received, the database table is changed to a read-write state to process the write request. The database table is then reset back to a read-only state, such as by periodically or occasionally running a background thread.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards database tables that are "read-mostly" in that there are far more read transactions than write transactions that need to be processed. By way of example, it is common to have database tables in an OLTP environment that are mostly read only, with only infrequent updates. One such example is a table of securities, such as representing a stock index, which are rarely changed. Although once in a while a new security is added or an existing one is dropped, for the most part the set of securities that make up the index are unchanged.

As described below, by favoring readers over writers, better performance is obtained with respect to such types of tables. More particularly, in conventional operation, many transactions acquire the read lock. Even though there is no contention at the lock level (logically readers do not conflict), the lock is mapped to the same lock-hash-slot, which is protected by a global spinlock. As a result, when attempting to scale over sixteen CPUs, performance throughput drops; this is because global spinlock transactions increase on the order of $N^2$, where N is the number of CPUs, creating a bottleneck.

Described herein is a technology that exploits the knowledge that changes to such read-mostly tables are infrequent. In general, the database management system avoids taking locks during reads, thereby improving code path length and also facilitating scaling. Example implementations have been tested that scale beyond sixty-four CPUs.

While many of the examples herein are described with respect to a database management system such as SQL server, it is understood that other types of database systems may benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and information processing in general.

Figure 1:
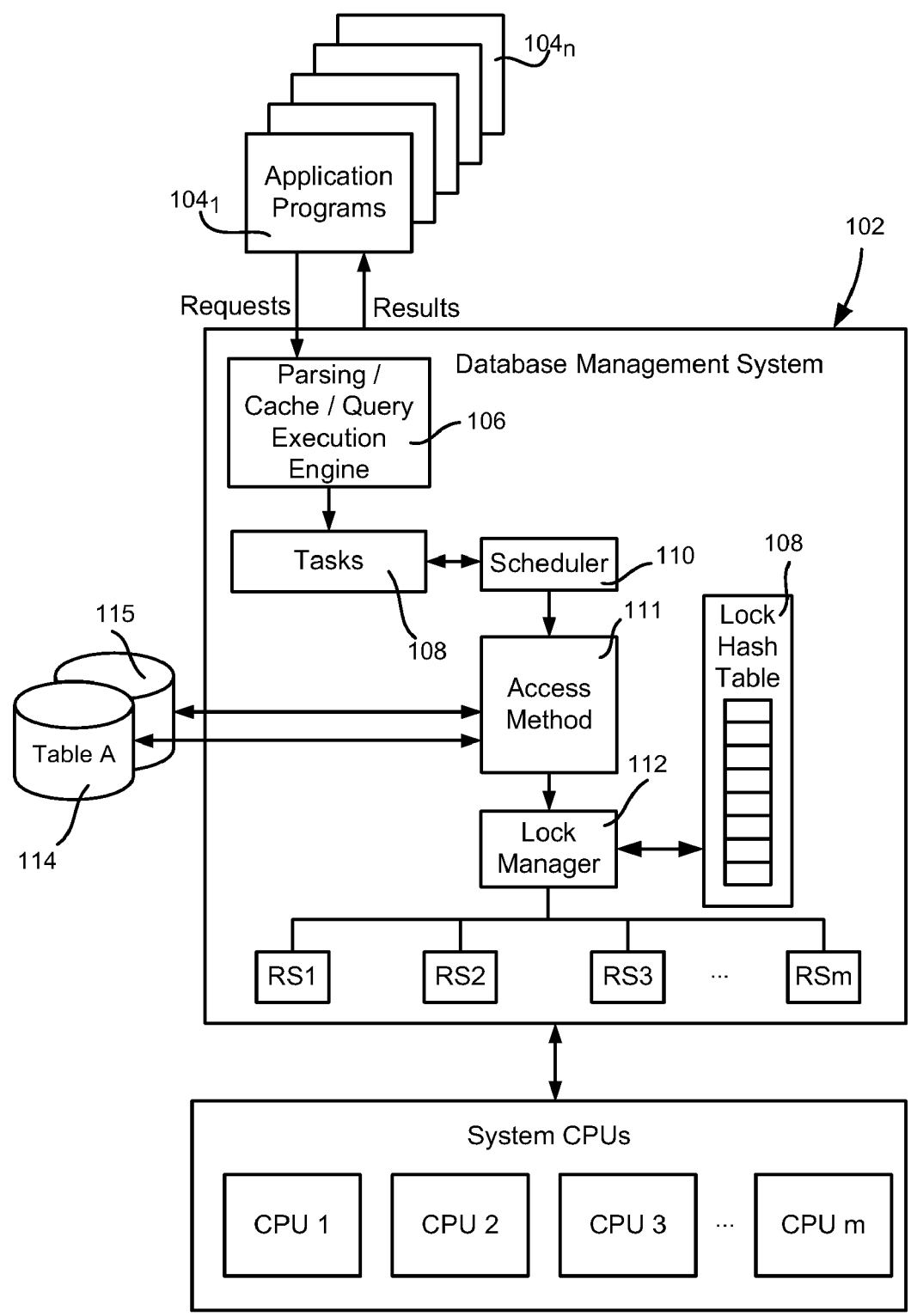
FIG. 1 is a block diagram representing an example database management system coupled to a read-mostly table in which read locks are partitioned so as to be associated with each of a plurality of CPUs.

Turning to FIG. 1, there is shown an example implementation, referred to as lock partitioning, for handling requests directed towards read-mostly tables. In FIG. 1, a database management system 102 processes read and write requests (transactions) from application programs $104_1$-$104_n$. As is generally known, the requests correspond to (e.g., are parsed and optimized into a plan cache and handled by a query execution engine 106 or the like into) tasks 108 that are run by a scheduler 110.

To perform a task, such as to read query data via an access method 111, a lock manager 112 needs to get a shared lock on the resource (such as a row of a table A 114) corresponding to the request. To this end, the lock manager 112 accesses a lock hash table 116. However, unlike other systems, a resource identifier (ID) and a CPU ID (which may be any assigned number that is unique among each of the CPUs) are combined and used to map into the lock hash table 116. By combining the CPU ID with the resource ID, each maps to a different read spinlock, represented in FIG. 1 via the blocks labeled RS1-RSm. This partitions each shared lock on a per-CPU basis. Note that it is feasible to have less than a one-to-one lock-to-CPU ratio, e.g., one lock may handle more than one CPU, which may hurt read performance to an extent but will help write performance, as described below.

The database management system 102 only acquires table-level locks. The shared read spinlocks RS1-RSm on the table (e.g., 114) are partitioned and thus are local to each system processing unit, shown in FIG. 1 by the blocks labeled CPU1-CPUm. The exclusive lock on a given table is thus acquired on one of the partitions.

Note however that to avoid conflicts, writers need to block all readers (and vice-versa). To this end, a writer needs to acquire a write lock on each of the CPUs, and also take care to avoid deadlocks, which can negatively impact performance because acquiring write locks on every CPU is expensive. However, with read-mostly tables, such writes are infrequent.

Figure 2:
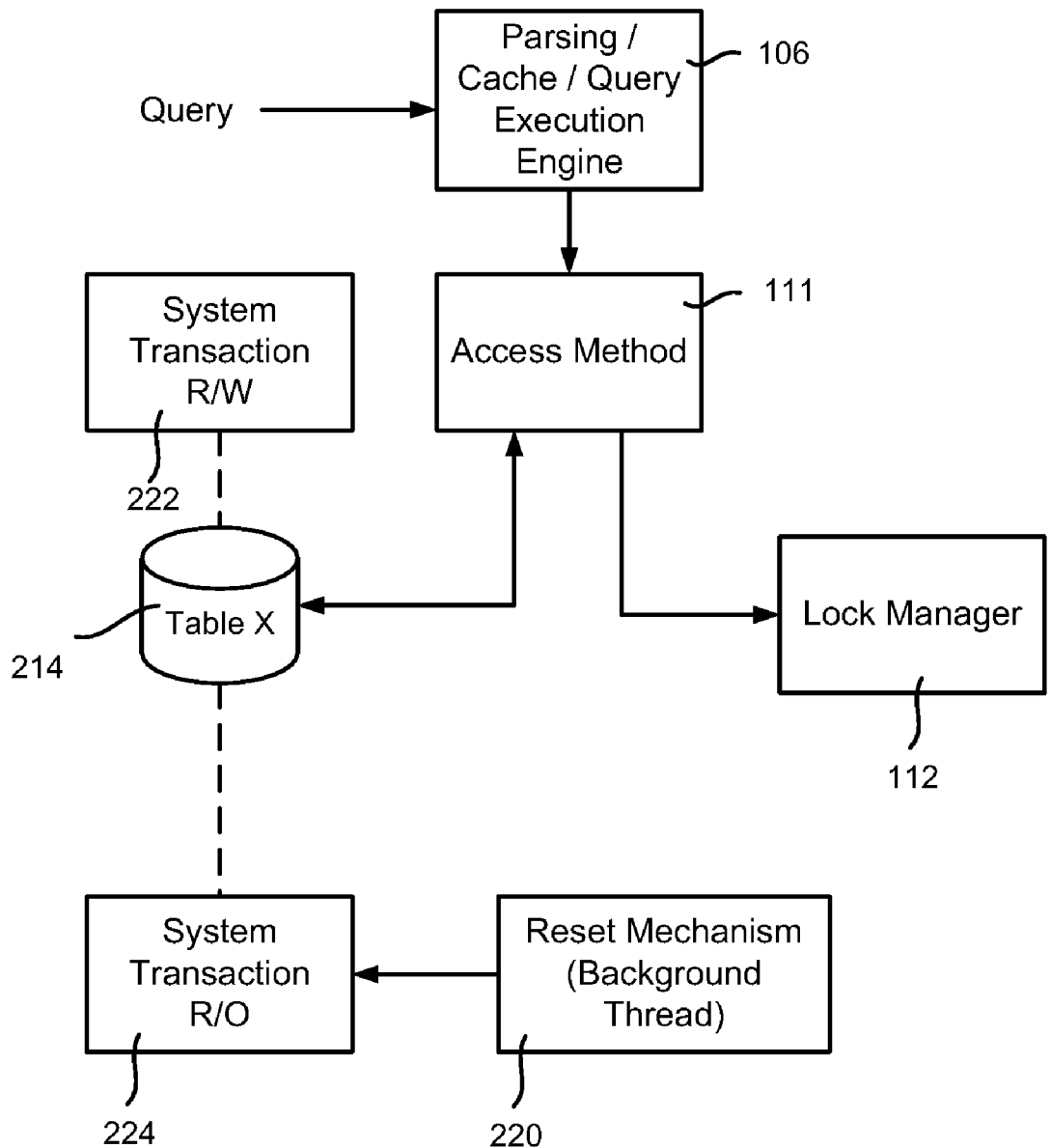
FIG. 2 is a representation of various components that may be used to change the state of a read-mostly database table between read-only and read-write states.

Turning to FIG. 2, an alternative example implementation generally operates by maintaining the database table (e.g., table X 214) in one of two different states, namely a read-only state or a read-write state. With a read-mostly table, the table is set into a read-only state by default, and tends to stay there the majority of the time, only changing to a read-write state when necessary to handle a (generally infrequent) write. As described below, a reset mechanism (e.g., a background thread 220) puts the table back into a read-only state. Because reads do not conflict, there is no need to acquire locks on a resource in the read-only state, significantly increasing performance.

More particularly, internally, each table (e.g., 214) has two states, read-only and read-write. Tables that are declared read-mostly will alternate between the two states depending on the workload. While the table is in read-only state, readers get a table-level intent share lock, but no page or row locks.

When an updater (or schema-changer) sees the table in the read-only state, an access method 111 corresponding to the updater starts a system transaction 222, which gets an exclusive lock on the table 214, changes the table 214 state to read-write and commits. While the table 214 is in read-write state, a normal locking protocol is followed.

Figure 3:
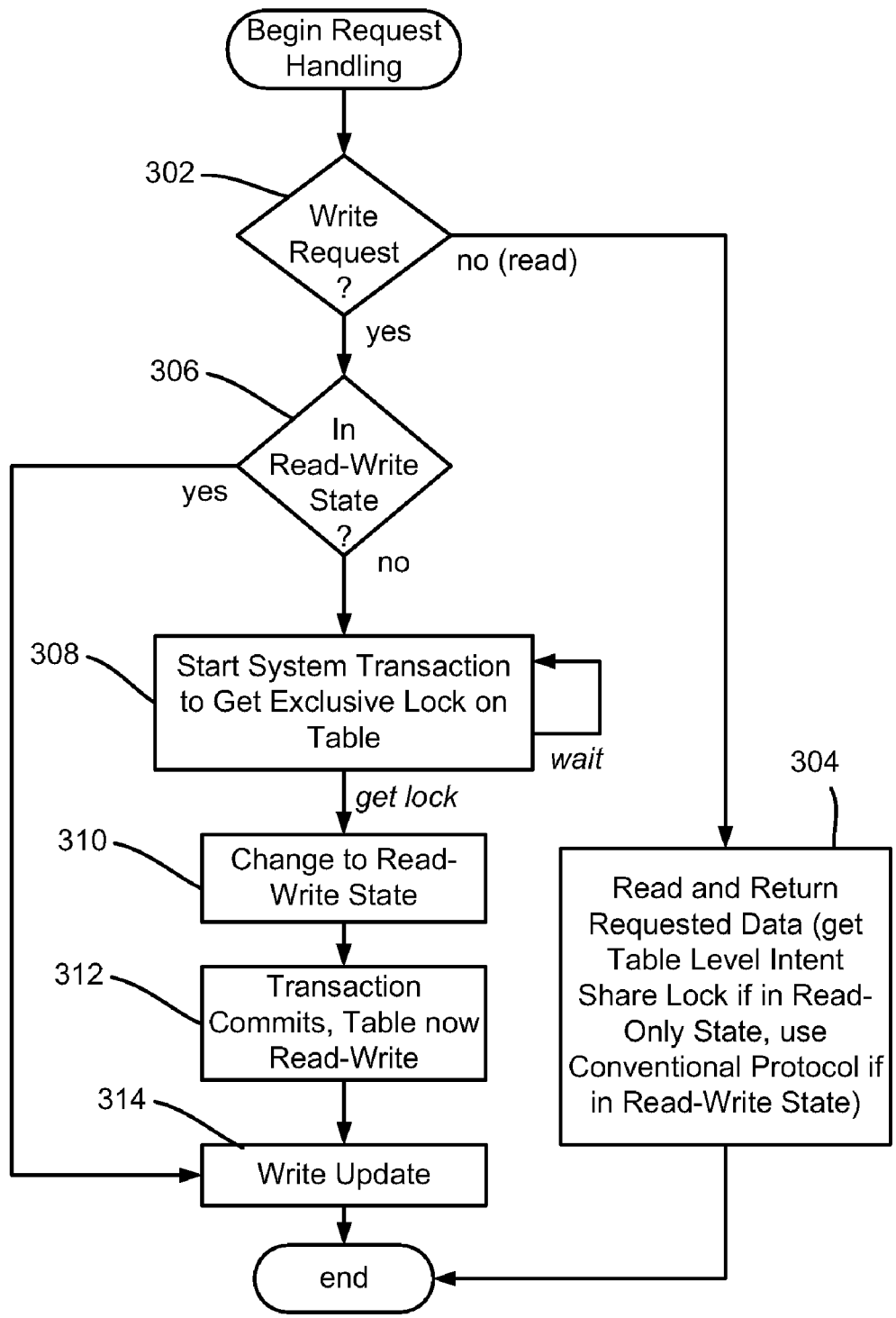
FIG. 3 is a flow diagram representing example steps taken to handle a read or write request in a state-changing environment.

FIG. 3 summarizes the general example operation of handling a request, beginning at step 302 where the access method checks whether a task corresponds to a write request. If not, that is, the request is a read request, step 302 branches to step 304 where the requested data is read and returned. Note that as shown in step 304, the access method may work with the lock manager to get a table level intent share lock when the table is in the read-only state, or use the conventional locking protocols when the table is in the read-write state.

If the request is a write request, step 306 determines whether the table is already in a read-write state. If so, step 306 branches to step 314 and writes the update using conventional locking protocols. If instead the table is in a read-only state, step 306 branches to step 308 where a system transaction is started to get an exclusive lock on the table. When obtained, steps 310 and 312 are executed to change the table to the read-write state as the system transaction commits. At this time, the update may be written (step 314).

As described above, a reset mechanism comprising a background thread 220 in this example periodically (or otherwise occasionally) checks if a read-mostly table is in the read-write state. If the table 214 has not had any updates in the recent past (what is considered recent is configurable), the thread 220 starts a system transaction 224, which gets an exclusive lock on the table 214, changes the table 214 to the read-only state and commits.

Figure 4:
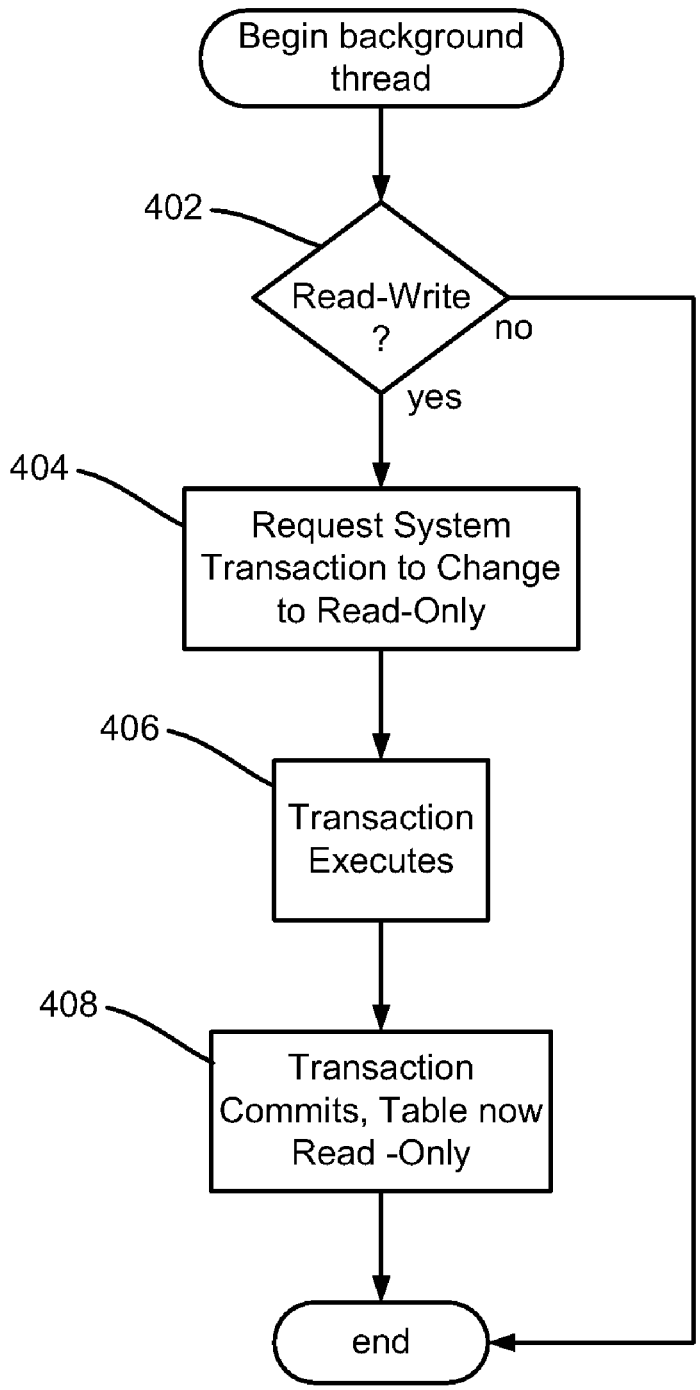
FIG. 4 is a flow diagram representing example steps taken to reset a read-mostly database table to a read-only state in a state-changing environment.

FIG. 4 summarizes example steps that may be taken by the background thread, beginning at step 402 which represents evaluating whether a table is in the read-write state. If not, that is, the table is read-only, then nothing need be done and the background thread can end, at least with respect to this table.

If the table is in the read-write state at step 402, step 404 is executed to start a system transaction to get an exclusive lock on the table. When obtained, steps 406 and 408 are executed to change the table back to the read-only state as the system transaction commits.

The background thread 220 may operate on a timed-basis, or on some other event. For timed-operation, the time may be empirically determined for a certain type of table, may be user configurable, and/or may be set by statistics, data mining, or the like.

Note that getting an exclusive lock momentarily blocks all of the readers, and it is thus relatively expensive to change states, but this is acceptable in environments in which the updates happen in a batch, or are otherwise infrequent. It has been deemed acceptable in TPC-E evaluation of the read-mostly tables.

As can be readily appreciated, the knowledge that certain tables are read-mostly allows readers to be favored over writers, whereby scalable and high-performing algorithms may be implemented. This knowledge is not only helpful in non-clustered environments but also in clustered environments.

Exemplary Operating Environment

Figure 5:
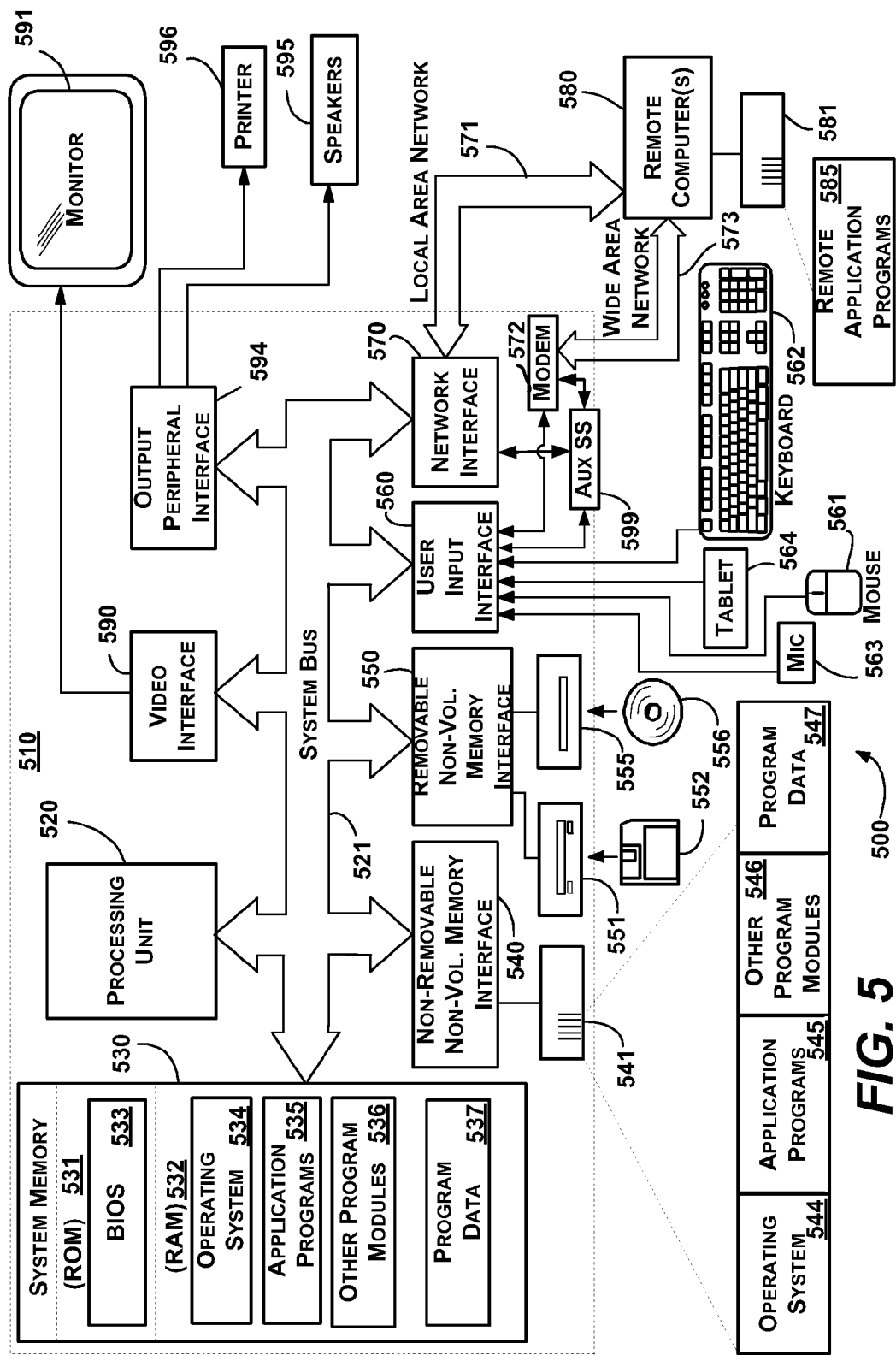
FIG. 5 shows an illustrative example of a computing environment into which various aspects of the present invention may be incorporated.

FIG. 5 illustrates an example of a suitable computing system environment 500 on which the examples of FIGS. 1-4 may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component 574 such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
    implementing a mechanism in a database management system to process read requests and write requests from a plurality of CPUs for a read-mostly database table including one or more resources, the mechanism using a plurality of locks controlling access to the one or more resources, the mechanism operable to partition a respective lock for each of the one or more resources, each lock partition of the respective lock operable to share access to a corresponding resource with other lock partitions of the respective lock;
    receiving a first read request from a first CPU and a second read request from a second CPU of the plurality of CPUs, both the first and second read requests requesting to access a first resource of the one or more resources;
    providing a first lock partition of a lock to the first read request accessing the first resource from the first CPU of the plurality of CPUs, wherein said providing the first lock partition comprises hashing a unique identifier of the first CPU and a unique identifier of the first resource to map to a first slot in a hash table that provides the first lock partition;
    providing a second lock partition of the lock to the second read request accessing the first resource from the second CPU, the first lock partition and the second lock partition operable to share the lock, wherein said providing the second lock partition comprises hashing a unique identifier of the second CPU and the unique identifier of the resource to map to a second slot in the hash table that provides the second lock partition; and
    processing the first and the second read requests to access the first resource by performing a read access by each of the first and the second read requests.

2. The method of claim 1, wherein each lock partition, when acquired by each CPU is operable to share access to a respective resource with other lock partitions for CPUs other than the respective each CPU for that respective lock.

3. The method of claim 2, further comprising:
    receiving a write request from a third CPU of the plurality of CPUs to access the first resource;
    providing the lock for the third CPU for the first resource to block remaining CPUs of the plurality of CPUs; and
    processing the write request by writing to the first resource.

4. The method of claim 1, wherein the mechanism further comprises a database table state changing mechanism, wherein the database table state changing mechanism is configured to maintain the read-mostly database table in one of a read-only state or a read-write state, the method further comprising:
    maintaining the read-mostly database table in a read-only state until a write request from a third CPU of the plurality of CPUs is received;
    changing state of the read-mostly database table to a read-write state to process the write request to access the first resource; and
    processing the write request by writing to the first resource;
    resetting the state of the read-mostly database table back to the read-only state after processing the write request.

5. The method of claim 4, wherein resetting the state of the read-mostly database table back to the read-only state comprises:
    running a background thread that changes the state of the read-mostly database table from the read-write state to the read-only state.

6. The method of claim 4, wherein changing the state of the read-mostly database table to a read-write state comprises:
    starting a system transaction to acquire an exclusive lock on the read-mostly database table, wherein the exclusive lock allows the system transaction to change state of the read-mostly database table and prevents other transactions and CPUs from accessing the read-mostly database table; and
    changing the state of the read-mostly database from the read-only state to the read-write state.

7. The method of claim 4, wherein resetting the state of the read-mostly database table to the read-only state comprises:
    starting a system transaction to acquire an exclusive lock on the read-mostly database table; and
    changing the state of the read-mostly database table from the read-write state to the read-only state.

8. The method of claim 1, wherein access by a subsequent read request from the first CPU requesting access to the first resource is determined using the first lock partition.

9. The method of claim 1, further comprising:
    receiving a first write request from the first CPU requesting access to the first resource;
    providing the lock to the first write request for accessing the first resource from the first CPU;
    processing the first write request to access the first resource by performing a write access by the first write request while blocking all other read requests and write requests to the first resource from any CPU of the plurality of CPUs.

10. In a computing environment, a system comprising;
    a database table that is accessed more often to process read requests from a plurality of CPUs than to process write requests from the plurality of CPUs;
    a database management system, under controlled of a processing unit, coupled to the database table and configured to change state of the database table between a read-only state and a read-write state, the database management system configured to:

maintain the state of the database table in a read-only state until a write request from a first CPU of the plurality of CPUs is received by granting a table level share lock to read requests from the plurality of CPUs, the read-only state allowing access to the database table by the read requests from the plurality of CPUs, the database table directly accessible by the read requests and write requests from each of the plurality of CPUs;

change the state of the database table to a read-write state to process the write request from the first CPU by obtaining an exclusive lock on the database table for the first CPU and changing the state of the database table to the read-write state, the read-write state preventing system transactions and requests by CPUs other than the first CPU from accessing the database table;

process the write request by writing to the first resource; and reset the state of the database table back to the read-only state after processing the write request by running a background thread that changes the state of the database table from the read-write state to the read-only state.

11. The system of claim 10, wherein the database management system, when changing the state of the database table to a read-write state, is further configured to:

start a system transaction that obtains the exclusive lock on the database table, wherein the exclusive lock allows the system transaction to change state of the database table and prevents other system transactions and CPUs from accessing the database table and changes the state of the database table from the read-only state to the read-write state.

12. The system of claim 10, wherein the database management system, when resetting the state of the database table to the read-only state, is further configured to:

execute the running background threat to start a system transaction to acquire the exclusive lock on the database table and to change the state of the database table from the read-write state to the read-only state.

13. A computer storage medium having computer-executable instructions, which when executed perform steps, comprising:

operating a database table in a read-only state for processing read requests from a plurality of CPUs, where the database table is configured to be in one of a read-only state or a read-write state, the database table operating in the read-only state by granting a table level share lock to read requests from the plurality of CPUs, the read-only state allowing access to the database table by the read requests from the plurality of CPUs, the database table directly accessible by read requests and write requests from each of the plurality of CPUs;

processing a write request from a first CPU of the plurality of CPUs to access a first resource in the database table by obtaining an exclusive lock on the database table including by changing the state of the database table to a read-write state, the read-write state preventing system transactions and requests from CPUs from accessing the database table;

writing an update to the first resource; and resetting the state of the database table to the read-only state for processing other read requests by running a background thread that changes the state of the database table from the read-write state to the read-only state.

14. The computer storage medium of claim 13, wherein changing the database table to the read-write state comprises starting a system transaction to obtain the exclusive lock on the database table, wherein the exclusive lock allows the system transaction to change state of the database table and prevents other system transactions and CPUs from accessing the database table; and changing the state of the database table from the read-only state to the read-write state.

15. The computer storage medium of claim 13, wherein resetting the state of the database table to the read-only state comprises running the background threat to start a system transaction to obtain the exclusive lock on the database table, wherein the exclusive lock allows the system transaction to change state of the database table and prevents other system transactions and CPUs from accessing the database table.

16. The computer storage medium of claim 13, wherein the table level share lock shares access with other system transactions and CPUs to the database table.

* * * * *